United States Patent [19]
Kambayashi et al.

[11] Patent Number: 5,753,370
[45] Date of Patent: May 19, 1998

[54] ARTIFICAL SNOWSEED AND METHOD FOR MAKING ARTIFICIAL SNOW

[75] Inventors: Taiji Kambayashi, Yamatotakada; Hideyuki Mekata, Nara-ken; Hiroaki Umezu, Tokyo; Hiroshi Matsunaga, Kasukabe, all of Japan

[73] Assignees: Osaka Organic Chemical Industry Co., Ltd.; Snova Corp., both of Japan

[21] Appl. No.: 607,017

[22] Filed: Feb. 26, 1996

Related U.S. Application Data

[63] Continuation of Ser. No. 228,210, Apr. 15, 1994, abandoned.

[30] Foreign Application Priority Data

Apr. 15, 1993 [JP] Japan .................................. 5-111143

[51] Int. Cl.⁶ .................. C09K 3/24; B32B 5/16
[52] U.S. Cl. .................. 428/405; 428/407; 106/287.13; 106/287.24; 106/287.27; 524/267; 524/269; 525/199
[58] Field of Search .................. 524/267, 269; 525/199; 428/405, 407; 106/287.13, 287.24, 287.27

[56] References Cited

U.S. PATENT DOCUMENTS

| | | | |
|---|---|---|---|
| 2,774,745 | 12/1956 | Hedlund | 524/267 |
| 3,770,685 | 11/1973 | Uffner et al. | 525/199 |
| 4,703,075 | 10/1987 | Egami | 524/269 |

FOREIGN PATENT DOCUMENTS

| | | | |
|---|---|---|---|
| 359168 | 3/1990 | European Pat. Off. | 524/269 |
| 0440256 | 2/1991 | European Pat. Off. | C09K 3/24 |
| 0440257 | 2/1991 | European Pat. Off. | C09K 3/24 |
| 0502484 | 3/1992 | European Pat. Off. | E01C 13/00 |
| 9014398 | 11/1990 | Japan | C09K 3/24 |
| 8602936 | 5/1986 | WIPO | C09K 3/24 |
| 8903865 | 5/1989 | WIPO | C09K 3/14 |
| WO93/19918 | 10/1993 | WIPO | 524/267 |

*Primary Examiner*—Mark D. Sweet

[57] ABSTRACT

An artificial snowseed in the form of granules of a super water-absorbing polymer already coated with a fluorine-containing material and/or a silicone oil. The granules can retain the original spherical form after absorption of water without sticking to each other. Further the present invention provides a method for making artificial snow comprising freezing the above artificial snowseed after absorption of water.

28 Claims, 1 Drawing Sheet

1mm

1mm

ARTIFICAL SNOWSEED AND METHOD FOR MAKING ARTIFICIAL SNOW

This is a continuation of Application Ser. No. 08/228,210, filed on Apr. 15, 1994 now abandoned.

BACKGROUND OF THE INVENTION

1. Field of the Invention

The present invention relates to an artificial snowseed and to a method for making artificial snow. More particularly, the present invention relates to an artificial, spherical, granular snowseed of a super water-absorbing polymer which retains the original spherical form after absorption of water without sticking to each other. The spherical snowseed may be of a dry or a water-swollen form. The snowseed can be used for making artificial snow having an appearance of granules or rice-flour cakes by freezing. The resulting artificial snow exhibits good properties for gliding on skis over the slope covered with such snow, and the snow conditions may be properly adjusted to skiing.

2. Background Art (Natural snow)

There have recently been a marked decrease in snowfall and an accumulation of snow. As a result, the openings of many ski resorts is often hindered. In addition, in order to prepare a well-groomed packed ski slope, the natural snow on ski slopes requires frequent packing by a tracksetter because newly fallen natural snow is too soft and not suitable for smooth gliding on skis. On the other hand, the snow conditions on a tracksetter-groomed trail is not still suitable for a ski racing event, and the trail has to be groomed by treading it underfoot, followed by spraying water on the spread snow.

The slopes recreated by such means are very susceptible to the outside air temperature, and the quality of the snow varies widely from compact to corn with the passage of time. This is caused by sublimation and condensation of water molecules inside the snow layer thereby causing a change in the structure of snow crystals. It is not easy for skiers to glide smoothly on skis over slopes covered with corn snow; thus frequent snow-grooming, e.g. breaking the frozen crust is indispensable. These attempts are, however, still unsuccessful in giving a satisfactory results.

(Artificial snow)

Installation of snow machines has been popular in many skiing resorts to prolong the overall skiing season. Snow machines fall into two groups consisting mainly of a "gun" type and a "fan" type. A method of making artificial snow by snow machines comprises atomizing compressed water into a subzero atmosphere to make fine ice particles with the aid of adiabatic expansion of compressed air or the aid of cold air. The artificial snow thus produced contains 10% by weight or more of water, and has a density of about 0.3 to about 0.4 g/cm$^3$, and a mechanical strength of less than 1 kg/cm$^2$. The slope covered with such artificial snow is not suitable for skiing without being packed. Such artificial snow changes in quality more frequently than natural snow, and in certain cases, forms corn snow having an average outer diameter of about 1 to 5 mm in a few days. Corn snow is troublesome for skiers; and hence a measure similar to those as described above is necessary to overcome the accompanying problems.

A snow machine capable of shattering ice blocks by means of physical shock to make ice granules or snow flakes is also currently in use; however it is only capable of producing ice shavings or corn snow, and it is necessary to take measures to cope with the problems as described above.

Japanese Patent Publication No. 63-500526 discloses a method for making artificial snow, which comprises mixing the granules of a water-swellable material, i.e. water-absorbing polymer with water, and aerating the water-swollen granules to the air, followed by freezing. The snow thus produced, has an appearance of fine stiff ice, like "EISBAHN", rather than snow, and has a density of about 0.4 to 0.9 g/cm$^3$ with a mechanical strength of about 10 to several 100 kg/cm$^2$, because these properties are highly susceptible to the aerating or freezing conditions. When shattered by means of physical shock to make granular ice or snow flakes, such "Eisbahn"-shaped stiff ice produces only corn snow. Therefore, in order to make artificial snow suitable for covering ski slopes by using the above water-swellable material alone, addition of a surfactant, regulation of the particle size and the water content of snow as well as frequent grooming of the slopes are indispensable to prevent the frozen snow particles from further agglomeration. Such snow is too difficult to handle for ski hill operators.

As the snow conditions on outdoor slopes are highly susceptible to the weather, indoor ski resorts that can be opened the year around have recently become popular. Artificial indoor ski slopes are laid with the foregoing artificial snow, artificial ice granules, snow flakes, or artificial snow made from a water-swellable material, e.g. a water-absorbing polymer and water; however the aforesaid problems still remain unsolved in these artificial indoor ski slopes.

Another indoor ski slope is produced by laying a floor with a paste comprising the aforesaid water-swellable material, e.g. water-absorbing polymer and water (blending weight ratio=about 1/80 to 1/100), followed by refrigerating the whole floor to create a surface similar to those of skating rinks. The surface is thereafter groomed while scraping off the surface ice to make artificial snow on top of an ice bed. In addition to the aforesaid problems, indoor ski slopes created in this way have an inherent problem in that pole plant is not easy because there is an ice layer, like "Eisbahn", beneath the artificial snow.

The aforesaid problems can be solved by employing the artificial snow made by refrigerating a water-swollen, super absorbing polymer (Japanese Patent Laid-Open Application Nos. 4-43274 and 4-43275 to the applicant of the invention). The artificial snow is provided in the form of frozen granules of a water-swollen super absorbing polymer itself or in the form of ice crystals similar to ice needles or frost columns (see FIG. 2) which are formed from the water released by the swollen granules upon cooling. In this case, the kinematic friction factor (μk) increases unpreferably to about 0.04 to 0.10, compared to about 0.02 to 0.05 for natural powdery snow, as a result of the contact of the ski base with the granules. When the kinematic friction (μk) factor is 0.06 or more, it becomes hard to control skis, e.g. to turn, because of the slowing-down of speed. It gives a sense of incongruity, and spoils pleasure in gliding.

Some of the problems associated with natural snow or conventional artificial snow for use in creating a ski slope include the following: i) It is not easy to freely adjust the snow density or strength so that it matches the particular skill or preference of skier. ii) Snow conditions vary widely over the slope with the passage of time; therefore it is hard to maintain the snow quality at its optimum. iii) Investment and maintenance costs are too high. iv) Conventional artificial snow made from a water-swellable material (water-absorbing polymer) and water by freezing is provided as ice blocks which should be further shattered for use. v) High kinematic friction factor (μk).

It is accordingly an object of the present invention to provide artificial snow which has a kinematic friction factor ($\mu k$) similar to that of natural powdery snow and good properties for gliding over on skis, and to provide an artificial snowseed for making such snow.

SUMMARY OF THE INVENTION

The applicant has intensively investigated to solve the above-described problems, and as a result has found a new granular snowseed of a super water-absorbing polymer coated with a fluorine-containing material and/or a silicone oil, wherein the granular snowseed of the polymer can retain the original spherical form after absorption of water without sticking to each other.

The present invention resides in an artificial snowseed comprising granules of a super water-absorbing polymer coated with a fluorine-containing material and/or a silicone oil, wherein said granules can retain the original spherical form after absorption of water without sticking to each other.

The present invention also resides in the artificial snowseed wherein said fluorine-containing material is the same dispersant as used in the manufacture of said super water-absorbing polymer by a reversed-phase suspension polymerization.

The present invention further resides in the artificial snowseed wherein said fluorine-containing material is an acrylic copolymer.

The present invention still further resides in an artificial snowseed wherein said acrylic copolymer contains 10 to 90% by weight of an acrylic or methacrylic ester moiety having 3 or more of fluorine atoms.

The present invention provides a method for making artificial snow which comprises the steps of: (a) swelling granules of a super water-absorbing polymer in water to provide spherical water-swollen granules having an average diameter of about 0.05 to 2 mm, said water-swellable granules being able to retain the original spherical form after absorption of water without sticking to each other and having a deionized water-absorbing power of about 30 to 500 times its own weight, and said water-swellable granules being further coated with a fluorine-containing material and/or a silicone oil and having an average diameter of 20 to 500 µm, and (b) freezing the water-swollen granules by at least one means selected from the group consisting of the following steps:

(i) freezing the water-swollen granules on a refrigerated floor laid with refrigeration pipes, (ii) freezing the water-swollen granules by blending them with at least one coolant selected from the group consisting of dry ice, liquid carbon dioxide, and liquid nitrogen, and (iii) freezing the water-swollen granules on a refrigerated floor laid with refrigeration pipes after blending them with natural snow, artificial snow made by a snow machine, or icy snow made by shattering ice blocks, or freezing the water-swollen granules on the refrigerated floor after blending them with at least one coolant selected from the group consisting of dry ice, liquid carbon dioxide, and liquid nitrogen.

DETAILED DESCRIPTION OF THE PREFERRED EMBODIMENTS

Figure 1:
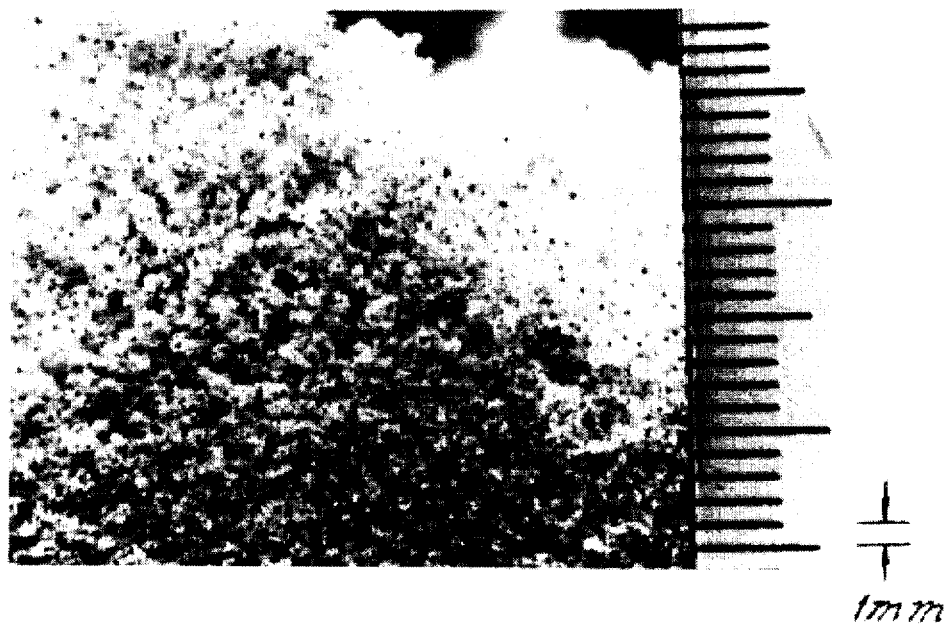
FIG. 1 is a microscopic photograph of artificial snow according to the present invention.
Figure 2:
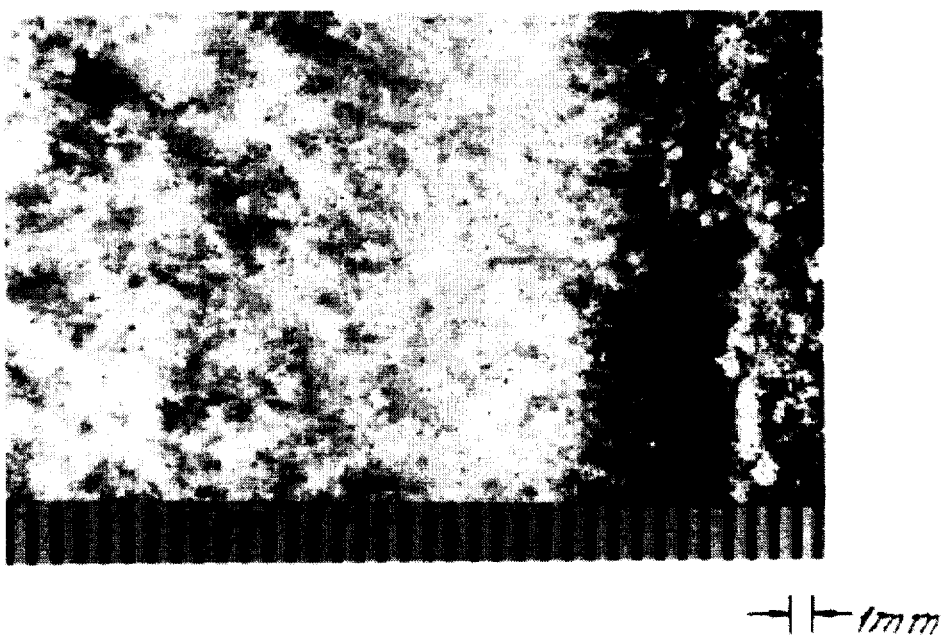
FIG. 2 is a microscopic photograph of artificial snow made by a conventional process.

Examples of the super water-absorbing polymers suitable for the present invention include starch or cellulose base polymers; and synthetic polymers, copolymers or terpolymers of acrylamide, acrylic acid, acrylic acid salt, methacrylic acid salt, styrene, vinyl ether, and the like. Among them, the preferred are a polyacrylic acid salt, a vinyl alcohol-acrylic acid salt copolymer, or a saponified isobutylene-maleic anhydride copolymer, these being provided as spherical granules by a reversed-phase suspension polymerization in the presence of an organic solvent.

Any reversed-phase suspension polymerization may be employed. A typical example is a reversed-phase suspension polymerization of a solution of acrylic acid and a salt thereof. The aqueous solution of acrylic acid and an acrylic acid salt thereof is prepared by partial neutralization of monomeric acrylic acid with an aqueous solution of an alkali metal salt such as sodium hydroxide, potassium hydroxide, or ammonium hydroxide. The preferred degree of neutralization is within the range of from 60 to 85% from the viewpoint of water-absorbing power and safety. Monomer concentrations in the aqueous solution are in the range of 35 to 75% by weight, preferably 40 to 70% by weight.

An unsaturated monomer capable of copolymerizing it with acrylic acid or its alkali salt may be used additionally so long as a super water-absorbing polymer can be provided.

When the reversed-phase suspension polymerization of the aqueous solution of acrylic acid and its alkali salt is carried out, a water-soluble persulfate such as potassium persulfate or ammonium persulfate, or hydrogen peroxide is preferably employed as an initiator because of the self-crosslinking nature of the polymer. The amount of initiator is within the range of from 0.1 to 2.0% by weight, preferably 0.2 to 1.0% by weight based on the monomers used.

Examples of the aliphatic hydrocarbon solvents suitable for use in the reversed-phase polymerization include aliphatic hydrocarbons such as n-pentane, n-hexane, n-heptane, and n-octane; alicyclic hydrocarbons such as cyclohexane and methyl cyclohexane, and decalin, with the preferred ones being n-hexane, n-heptane and cyclohexane.

Another requisite for preparing the super water-absorbing polymer is that the resultant polymer is crosslinked by using a crosslinking agent in the presence or in the absence of an inorganic substance.

Any compound having two or more of the functional groups capable of reacting them with carboxyl group or carboxylate group may be used as the crosslinking agent. Examples of the agents include, e.g. polyglycidyl ethers such as ethylene glycol diglycidyl ether, polyethylene glycol diglycidyl ether, glycerine triglycidyl ether; haloepoxy compounds such as epichlorohydrin, a-methylchlorohydrin; polyaldehydes such as glutaraldehyde, glyoxal, with the preferred crosslinking agent being ethylene glycol glycidyl ether.

The amount of crosslinking agent is preferably within the range of from 0.05 to 2% by weight, depending on the particular crosslinking agent or dispersant employed. When the amount is less than 0.05% by weight, the fluidity and mechanical strength of the water-swollen granules become poor, and inversely when it is more than 2% by weight, the crosslinking density becomes too high, with the result of a marked decrease in water-absorbing power.

When the crosslinking is carried out in the presence of an inorganic substance, the fluidity of the resulting granules increases. Examples of the inorganic substance include white carbon, talc, hydrotalcite, and pulverized silica such as aerosol. A surfactant such as the conventional nonionic one may be used together with the inorganic substance.

The crosslinking agent may be added in the drying step for the resulting granules by azeotropic distillation or heating in vacuo, with the preferred step being azeotropic distillation.

Any process to coat the surface of granules of the super water-absorbing polymer with a fluorine-containing material or silicone oil may be used. The granules of a super water-absorbing polymer may be coated with a fluorine-containing material or silicone oil by a conventional blending or mixing process. When the super water-absorbing polymer is prepared by a reversed-phase suspension polymerization, the surface coating may also be carried out simultaneously by using an aliphatic hydrocarbon solution in which the fluorine-containing material or silicone oil is dispersed as a dispersant.

The amount of fluorine-containing material or silicone oil used as the dispersant is within the range of from 0.1 to 10% by weight, preferably 0.5 to 3% by weight on the basis of the total amount of acrylic acid and its monomeric alkali salt. When the amount is less than 0.1% by weight, an improvement effect on the gliding properties on skis cannot be exerted sufficiently, and the dispersibility of colloid during polymerization becomes poor, inversely when it is more than 10% by weight, any additional improvement effect on the gliding properties cannot be produced, and moreover often uneconomic because extremely fine granules form.

Examples of the fluorine-containing materials suitable for the invention include polymers and copolymers obtained by a suspension (co)polymerization or solution (co) polymerization of a fluorine base compound as a monomer. Examples of the fluorine base monomer include one such as a fluoroalkyl (meth)acrylate the fluorine atom being positioned on the moiety which does not participate in the polymerization. Another monomer is a compound the fluorine atom is positioned on the moiety which participates in the polymerization.

Example of the fluorine base monomer containing fluorine atom on the moiety which participates in the polymerization include, e.g. vinyl fluoride, vinylidene fluoride, 1-chloro-1-fluoroethylene, trifluoroethylene, chlorotrifluoroethylene, tetrafluoroethylene, hexafluoropropylene, hexafluoroisobutylene, perfluoro (methylvinylether), perfluoro(n-propylvinylether).

Examples of the fluoroalkyl (meth)acrylate include heptafluorobutyl acrylate, heptadecafluorooctyl acrylate, hexafluorobutyl methacrylate, heptadecafluorooctylethyl methacrylate, trifluoroisopropyl α-cyanoacrylate, trifluoroethyl α-chloroacrylate, 2,2,2-trifluoroethyl acrylate, 2,2,3,3-tetrafluoropropyl acrylate, 1H,1H,5H-octafluoropentyl acrylate, 1H,1H,2H,2H-heptadecafluorodecyl acrylate, 2,2,2-trifluoroethyl methacrylate, 2,2,3,3-tetrafluoropropyl methacrylate, 1H,1H,5H-octafluoropentyl methacrylate, 1H,1H,2H,2H-heptadecafluorodecyl methacrylate, and the like.

The preferred fluorine-containing material is an acrylic (co)polymer obtained from a fluoroalkyl (meth)acrylate, more preferably an acrylic (co)polymer which contains 10 to 90% by weight of a fluoroalkyl (meth)acrylate moiety having 3 fluorine atoms. When the fluoroalkyl (meth)acrylate is less than 10% by weight, an improvement effect on the gliding properties on skis cannot be exerted sufficiently, and inversely when it is more than 90% by weight, blocking sometimes occurs in the preparation step of the super water-absorbing polymer.

Examples of the monomer capable of copolymerizing it with the fluoroalkyl (meth)acrylate include a (meth)acrylate or a (meth)acrylamide and/or an alkyl (meth)acrylate having at least one alkyl group. These copolymerizable unsaturated monomers have a functional group such as carboxylic acid, hydroxyl, amino, or amide group.

The amount of (meth)acrylate or (meth)acrylamide moiety in the aforesaid acrylic (co)polymer is preferably within the range of from 5 to 40% by weight. When the amount is less than 10% by weight, blocking sometimes occurs in the preparation step of the super water-absorbing polymer. When it is more than 40% by weight, the above acrylic (co)polymer to be used as a dispersant becomes hard to dissolve in the aforesaid aliphatic hydrocarbon solvent.

The amount of other copolymerizable unsaturated monomers is preferably within the range of from 0 to 85% by weight.

Any silicon oil including low-, medium- and high-viscosity products may be used. Typical examples include methyl silicone oils, fluoromethyl silicone oils, phenylmethyl silicone oils, methylhydrogen silicone oils, silicone oil-polyether copolymers, and amino-modified silicone oils.

The form of the super water-absorbing polymer of the present invention is preferably in the form of granules, and the more preferred form being spheres. The preferred average particle size of the super water-absorbing polymer is within the range of from about 20 to 500 μm before absorption of water, and within the range of from about 0.05 to 2 mm after absorption of water. When the particle size before absorption of water is about 20 μm or less, very hard snow is obtained because the granules are too fine. When it is more than about 500 μm, artificial snow in the form of corn is obtained unpreferably.

Spherical granules of a super water-absorbing polymer is preferred for the following reasons: i) It is easy to handle. ii) The resulting artificial snow granules are also in the spherical form, and can provide good gliding properties. iii) It can be readily blended with natural snow.

In order to make the granules to retain the original spherical form with good fluidity even after absorption of water, it is desirable to increase the crosslinking degree of the super water-absorbing polymer by using a polyvalent epoxy or amine compound as a crosslinking agent while regulating the amount so as to produce proper water-absorbing power. When the crosslinking degree is too high, the water absorbing power decreases unpreferably.

One of the good reasons why the super water-absorbing polymer according to the present invention can retain the original spherical form with good fluidity even after absorption of water may be that there is little clinging water among the water-swollen granules, and the opening in the granules increases due to the sliding of the granules with each other.

A water-absorbing polymer is also known in the market which becomes pasty after absorption of water. Such paste forms a large block of ice when it freezes. The ice block is not suitable as artificial snow for ski slopes without a shattering step. Of course, it is hard to maintain the shattered snow under suitable conditions for skiing as described above.

Depending upon the freezing method, the average particle size and the amount of water absorbed, the artificial snow-seed of the invention can be provide a series of different forms ranging from the form of finely dispersed powder to the form of rice-flour cakes wherein the individual particles contact lightly each other.

As FIG. 1 shows, when the artificial snowseed of the invention freezes, water oozes out of the artificial snowseed, and the surface of the granules is covered with frozen ice shells formed from the oozed water. Therefore, when an artificial ski slope is produced by laying it with the artificial snow of the invention, it is hard for the ski base and the granules to contact each other. In addition, as the surface of the granules are coated with a fluorine-containing material and/or a silicone oil, the artificial snow has a kinematic friction factor ($\mu k$) similar to that of natural powdery snow, e.g. of about 0.02 to 0.05 ($\mu k$), indicating a significant improvement in lubricating properties.

The deionized water-absorbing power of the super water-absorbing polymer is within the range of from about 30 to 500 times its own weight, preferably about 50 to 200 times. When the water-absorbing power is less than 30 times, it becomes hard to maintain the resulting snow in desired conditions because of its inability to absorb the liquid water being formed on melting. When it is more than 500 times, the gel strength after absorption of water is impaired, and the water-swollen granules become fragile against pressure unpreferably.

The snowseed of the invention may be shipped before absorption of water, or as water-swollen granules.

Any absorption method may be acceptable for making the water-swollen granules of the super absorbing polymer. The granules may be placed in water while stirring, followed by allowing them to stand for several minutes. Temperature has impact on the absorption rate. As temperature becomes higher, the rate becomes higher or vice versa; therefore it is desirable to heat the water properly when the temperature is below 10° C.

Any method may be employed for refrigerating the snowseed of the invention. Examples of the method include refrigeration of the snowseed with the aid of a coolant such as dried ice, liquid nitrogen, liquid air, or liquid carbon dioxide while mixing. A typical method comprises placing the snowseed on a refrigerated floor laid with refrigeration metal pipes. Another method comprises using the aforesaid snow-falling or snow-making machine. The most preferred method may be selected on the desired snow quality. The refrigerating method by using liquid nitrogen, liquid air or liquid carbon dioxide is preferably accepted because these liquid coolants are mixed readily with the water-swollen granules of a super water-absorbing polymer, and the snowseed may be refrigerated in a short period of time by the aid of vaporization latent heat of these coolants. Other coolants similar to these may be also employed, with liquid carbon dioxide being preferred. Liquid carbon dioxide exhibits a good refrigerating effect, and inexpensive and easy to handle and get.

A typical method of making snow of the invention comprising the steps of: swelling the water-swellable granules of a super water-absorbing polymer in water until water-swollen granules having an average particle size of about 0.05 to 2 mm can be obtained, wherein the water-swellable granules have an average particle size of about 20 to 500 μm and a deionized water-absorbing power of about 30 to 500 times its own weight, and can retain the original spherical form after absorption of water without sticking to each other, mixing the water-swollen granules with natural snow, artificial snow made by a snow-falling machine, or icy snow made by shattering ice blocks, and refrigerating the mixture by blending it with liquid carbon dioxide. In this case, the water-swollen granules alone may be refrigerated.

Liquid carbon dioxide is obtained from the market. Liquid carbon dioxide has a vaporization latent heat of 15.1 Kcal/Kg (at 30° C.), 48.1 Kcal/Kg (at 10° C.), and 56.1 Kcal/Kg (at 0° C.). The latent heat is utilized favorably for cooling or refrigerating.

Liquid carbon dioxide is manufactured by liquefying gaseous carbon dioxide at a pressure of about 40 atm under cooling. Resources of carbon dioxide are natural gas, off-gas from ammonium manufacturing plants, off-gas from petroleum refining and ethylene manufacturing plants. Other off-gas or tail gas evolved in petrochemical plants or steel works may also be used as the source.

Any method, such as manual labor or a mechanical automatic means, may be employed for mixing the water-swollen granules of a super water-absorbing polymer with liquid carbon dioxide, for freezing the mixture, and for laying the resulting powdery artificial snow over a floor of an indoor ski slope. Although the aforesaid snow-falling or snow-making machine may be employed, a quick-freezing method under the direct contact of liquid carbon dioxide with the water-swollen granules may be preferably employed for this purpose.

Any amount of carbon dioxide or coolant may be employed so far as the temperature of the resulting artificial snow is within the range of from about 0° to minus 30° C. The preferred temperature will depend on various conditions.

Any known method for mixing the water-swollen granules of a super water-absorbing polymer with natural snow and the like may be used. The granules/snow ratio is preferably within the range of 99/1 to 1/99 by weight, more preferably 99/2 to 20/80, depending on the purpose.

Ski slopes may be laid with the artificial snow alone made from the snowseed of the invention. Such independent use makes the slope easy to produce and maintain. Natural snow, artificial snow or icy snow made by other methods may be properly blended.

In producing an artificial ski slope, the floor may be laid with snow, e.g. in the form of rice-flour cakes, followed by laying the surface with powdery snow, whereby a ski slope troubleless and easy to plant poles can be produced.

The snowseed of the invention may be recycled for reuse after drying.

In addition, it is environmentally safe to dispose the used snowseed because the snowseed of the invention is photodecomposable and/or biodegradable; however a known accelerator, catalyst, additive may blended, added, impregnated or coated, if early degradation is desired, to accelerate photodecomposition or biodegradation. The snowseed of the invention are not harmful to the health; therefore these additives should be properly selected after due consideration of safety first.

The snowseed of the invention may be colored with known pigments or dyes. The artificial snow made from the colored artificial snowseed looks beautiful, and a commercial value may be added to it. For example, discrimination of ski slopes by coloring for beginners or experts may add a more fun.

Further, other additives, e.g. perfume, fragrance, or aroma may be added.

An antioxidant, ultraviolet absorber, fluorescent agent, nucleating agent, extender, friction improver, and the like may also be added so far as the properties of the resulting snow are not impaired.

The invention is further illustrated by the following examples which are set forth by way of illustration only and not by way of limitation.

[EMBODIMENT]

Performance test procedures in the following examples are as follows:

(Deionized Water-Absorbing Power)

The dry granules of a polymer in an amount of 0.5 g are dispersed in 1000 ml of deionized water and allowed to stand for about 24 hours. The resulting water-swollen granules are filtered through a 60-mesh wire net. The water-swollen granules are weighed to measure the weight (W). The water-absorbing power is determined by dividing (W) by ($W_0$), wherein $W_0$ is the weight of dry granules.
(Fluidity after Absorption of Water)

The dry granules of a polymer in an amount of 1.0 g are added to 50 ml of deionized water for saturation. Fluidity are evaluated visually under gentle vibration and reported as o (for good), x (for bad) or Δ (for normal).
(Bulk Density after Absorption of Water)

Into a 100-ml beaker are added the water-swollen granules of a super water-absorbing polymer in an amount of about 20 g at a time until the beaker is packed with the granules up to the 100 cc marked line while holding the surface down. The bulk density is determined by dividing the weight by the volume.
(Density of Artificial Snow after Freezing)

Frozen snow with known volume is weighed. The density (g/cm$^3$) is determined by dividing the weight by the volume. When the sample snow is soft, a thin stainless steel box with known volume for sticking it into snow is conveniently used for the purpose; inversely when the sample snow is hard, the volume calculated by measuring the dimensions of a snow cube made by sawing the frozen snow is used instead.
(Mechanical Strength of Artificial Snow after Freezing)

A disc in an adapter is released to fall straight on to an artificial snow sample. Repeat the procedure by a Kinoshita's Hardness Tester (Trade Name) while changing the adapter so that the disc can sink to a depth of about 7 to 30 mm beneath the surface. The strength is calculated by using a conversion table. In case of powdery snow, the feeling of the snow sample is noted, e.g. by "powdery".
(Kinematic Friction Factor μk after Freezing)

The water-swollen granules of a water-absorbing polymer are spread in a layer to a depth of about 5 cm over an inclined floor (10°) laid with flexible plastic cooling pipes having an inner diameter of 5 mm, followed by refrigerating the layer by circulating brine at minus 20° C. for about 20 hours to make artificial snow. A ski slope (13 m in length) is produced by treading the snow. The time (t) required for gliding over the slope on practical skis coated with only base wax alone is measured. The kinematic friction factor is calculated from the following formula:

$$\mu k = (g \sin\theta - 2x/t^2)/g \cos\theta$$

wherein,
g: kinematic accelerated velocity (9.80 m/sec$^2$)
θ: inclined angle of slope (10°)
x: length of slope (13 m)
t: time required (sec)

PREPARATIVE EXAMPLES 1–8

(Preparative Example 1)
Spherical Granules of Super Water-Absorbing Polymer and the Properties of Artificial Snowseed and Snow Into a 500 ml-separable flask equipped with a stirrer, a reflux condenser, a dropping funnel, a thermometer, and a nitrogen inlet tube was fed 150 g of deionized water, followed by addition of 0.2 g of a partially saponified polyvinyl alcohol (available from NIPPON GOSEI KAGAKU K.K., under Trade Mark GH-23). After melting of the contents, the flask was purged with a nitrogen stream.

Separately, into an Erlenmeyer flask were fed and dissolved 25.0 g of heptadecafluorodecyl methacrylate (available from Osaka Organic Chemical Industry Co. Ltd., under Trade Mark VISCOAT V-#17FM), 5.0 g of hydroxyethyl methacrylate (HEMA), 5.0 g of methacrylic acid (MMA), 15.0 g of methyl methacrylate (MMA), and 1.0 g of azobisdimethylvaleronitrile. The resulting mixture was added dropwisely to the aforesaid separable flask over a period of one hour while bubbling a nitrogen stream. After holding for 5 hours at 65° C. to complete reaction, the solid matter was filtered after cooling and washed with water, followed by drying it in vacuo whereby a dispersant (a fluorine-containing acrylic copolymer) in the form of beads was obtained.

The dispersant in an amount of 4.32 g and n-hexane in an amount of 360.7 g were added to a 1000-ml separable flask fitted with a stirrer, a reflux condenser, a dropping funnel, a thermometer and a nitrogen inlet tube. The contents were heated to 50° C. to disperse and dissolve, followed by nitrogen purging.

Separately, acrylic acid in an amount of 72.0 g was neutralized with 32.2 g of sodium hydroxide dissolved in 103.6 g of deionized water in an Erlenmeyer flask, followed by further addition of potassium persulfate (0.24 g) while dissolving it at room temperature. The aqueous monomer solution was added dropwisely to the aforesaid separable flask while stirring at 300 rpm under the bubbling of a nitrogen stream over a period of one hour. After reflux for two hours, 0.1 g of 30%-hydrogen peroxide was added and the reflux was further continued for a period of one hour to complete polymerization. Thereafter, 0.73 g of ethylene glycol diglycidyl ether was added, and the contents were dehydrated by azeotropic distillation, filtered and dried in vacuo whereby a super water-absorbing polymer in the form of white beads, already coated with the above-described fluorine-containing acrylic copolymer, was obtained.

(Preparative Examples 2 to 8)

Similarly, a dispersant (a fluorine-containing acrylic copolymer) of the composition as set forth in Table 1 was prepared. A super water-absorbing polymer in the form of white beads already coated with the fluorine-containing acrylic polymer was obtained by using the dispersant.

Test results of the resulting polymers for the water-absorbing power, average particle size, fluidity and bulk density after absorption of water, snow density and structure of snow crystals (whether ice crystals in the form of shells are present or not) are also set forth in Table 1.

In this case, the water-swollen particles (absorbed water is 50 times its own weight) were spread in a layer to a depth of 50 mm over a copper plate (2 mm thick) equipped with brine pipes, followed by refrigeration by circulating brine at minus 25° C. for 20 hours to make the sample snow.

[COMPARATIVE PREPARATIONS 1 TO 4]
Spherical Granules of Super Water-Absorbing Polymer and Properties of Artificial Snowseed and Snow (Comparative Preparation 1)

A dispersant (an acrylic copolymer which does not contain a fluorine moiety) of the composition set forth in Table 1 was prepared in a similar manner. A super water-absorbing polymer in the form of white beads was obtained by using the dispersant. The test results of the resulting polymer for the water-absorbing power, average particle size, fluidity and bulk density after absorption of water, density and structure of the artificial snow (whether ice crystals in the form of shells are present or not) are also set froth in Table 1.

(Comparative Preparation 2)

A dispersant (an acrylic copolymer which contains a fluorine moiety) of the composition set forth in Table 1, the composition being not within the scope of the present invention, was prepared in a similar manner. A water-absorbing polymer in the form of white beads already coated with the fluorine-containing acrylic copolymer was obtained. The test results of the polymer for the water-absorbing power, average particle size, fluidity and bulk density after absorption of water, snow density and structure of snow crystals (whether ice crystals in the form of shells are present or not) are also set forth in Table 1.

(Comparative Preparation 3)

Attempts to prepare a super water-absorbing polymer by using a dispersant (a fluorine-containing acrylic copolymer) of the composition outside the range of that of the method of the present invention were unsuccessful.

(Comparative Preparation 4)

A super water-absorbing polymer in the form of crushed pieces was obtained by using a dispersant (available from NIPPON SHOKUBAI K.K., under Trade Name Aqualic CAW) in a similar manner.

The test results of the polymer for water-absorbing power, bulk density after absorption of water, snow density and structure of snow crystals (whether ice crystals in the form of shells are present or not) are set forth in Table 1.

TABLE 1

| | | | Dispersant Composition of dispersant | | | | | | Artificial Snowseed | |
|---|---|---|---|---|---|---|---|---|---|---|
| | | | | | | | | | Average particle size (μm) | |
| | | | (acrylic copolymer) | | | | | Water- | | after |
| | | V-#17FM (wt %) | LA (wt %) | HEMA (wt %) | MAA (wt %) | DMMA (wt %) | MMA (wt %) | absorbing power (times) | before absorption of water | absorption of water (50 times) |
| Preparative Example | 1 | 50 | — | 10 | 10 | — | 30 | 80 | 100 | 400 |
| | 2 | 50 | — | 10 | 10 | — | 30 | 300 | 100 | 400 |
| | 3 | 50 | — | 10 | 10 | — | 30 | 90 | 30 | 100 |
| | 4 | 50 | — | 10 | 10 | — | 30 | 90 | 400 | 1500 |
| | 5 | 15 | 35 | 10 | 10 | — | 30 | 90 | 100 | 400 |
| | 6 | 80 | — | 10 | 10 | — | — | 100 | 100 | 400 |
| | 7 | 50(V-#8FM) | — | 10 | 10 | 5 | 30 | 100 | 100 | 400 |
| | 8 | 30(V-#4F) | 20 | 10 | 10 | — | 30 | 90 | 100 | 400 |
| Comparative Preparations | 1 | — | 50 | 10 | 10 | — | 30 | 80 | 100 | 400 |
| | 2 | 5 | 45 | 10 | 10 | — | 30 | 90 | 100 | 400 |
| | 3 | 95 | — | 5 | — | — | — | impossible to prepare a water-absorbing polymer | | |
| | 4 | Aqualic CAW(Nippon Shokubai Co.) | | | | | | 260 | 150–300 crushed pieces | |

| | | | Artificial Snow | | | |
|---|---|---|---|---|---|---|
| | | | Artificial Snowseed | | Snow structure | |
| | | | Fluidity after absorption of water | Bulk density after absorption of water | Snow density (g/cm³) | (Whether ice shells are present or not present) |
| Preparative Example | 1 | | ○ | 0.76 | 0.35 | present |
| | 2 | | Δ | 0.82 | 0.42 | present |
| | 3 | | ○ | 0.78 | 0.30 | present |
| | 4 | | ○ | 0.75 | 0.38 | present |
| | 5 | | ○ | 0.74 | 0.29 | present |
| | 6 | | ○ | 0.76 | 0.36 | present |
| | 7 | | ○ | 0.76 | 0.40 | present |
| | 8 | | ○ | 0.74 | 0.33 | present |
| Comparative Preparations | 1 | | ○ | 0.74 | 0.22 | not present (needles) |
| | 2 | | ○ | 0.75 | 0.23 | not present (needles) |
| | 3 | | | | | |
| | 4 | | | 0.91 | 0.82 | ice plates |

TABLE 1-continued

V-#17FM: Heptadecafluorodecyl methacrylate
V-#8FM: Octafluoropentyl methacrylate
V-#4F: Tetrafluoropropyl acrylate
LA: Lauryl acrylate
HEMA: Hydroxyethyl methacrylate
DMMA: Dimethylaminoethyl methacrylate
MMA: Methyl methacrylate
MAA: Methacrylic acid (Production of Artificial Skiing Slope)

Example 1

The water-swollen granules (absorbed water is 50 times its own weight) of the super water-absorbing polymer prepared in Preparative Example 1 were spread in a layer (about 5 cm in thickness) over an inclined floor (10°) laid with flexible plastic brine pipes having an inner diameter of about 5 mm.

When brine was circulated at minus 20° C. for about 20 hours, the polymer layer froze thereby producing powdery artificial snow. A snow-covered slope suitable for gliding on skis was created by treading the snow. The test results of the artificial snow for the shape, density, hardness and kinematic friction factor on the slope are set forth in Table 2.

Example 2

The water-swollen granules (absorbed water is 120 times its own weight) of the super water-absorbing polymer prepared in Preparative Example 1 were spread in a layer (about 5 cm in thickness) over an inclined floor (10°) in a similar manner as Example 1.

When brine was circulated at minus 20° C. for about 20 hours, artificial snow was produced in layers, i.e. powdery snow on top of an ice bed. A snow-covered ski slope suitable for gliding over it on skis was recreated by treading the snow. The test results of the artificial snow for the shape, density, hardness and kinematic friction factor on the slope are set forth in Table 2.

Comparative Example 1

The water-swollen granules (absorbed water is 50 times its own weight) of the water-absorbing polymer prepared in Comparative Preparation 1 were spread in a layer (about 5 cm in thickness) over an inclined floor (10°) in a similar manner as Example 1.

When brine was circulated at minus 20° C. for 20 hours, the layer froze. Powdery artificial snow was produced. A snow-covered ski slope was recreated by treading the snow. The test results of the snow for the shape, density, hardness and kinematic friction factor on the slope are set forth in Table 2.

Comparative Example 2

The water-swollen granules (absorbed water is 120 times its own weight) of the super water-absorbing polymer prepared in Comparative Preparation 1 were spread in a layer (about 5 cm in thickness) over an inclined floor (10°) in a similar manner as Example 1.

When brine was circulated at minus 20° C. for 20 hours, the layer froze. Powdery snow on top of an ice bed was produced. A snow-covered ski slope was produced by treading the snow. The test results of the snow for the shape, density, hardness and kinematic friction factor on the slope are set forth in Table 2.

Comparative Example 3

Attempts to recreate a snow-covered slope by laying the water-swollen granules of the water-absorbing polymer prepared in Comparative Preparation 4 were unsuccessful. Table 2 shows the results. Snow-shape matter could not obtained.

TABLE 2

| | Artificial snowseed | Absorbed water (times) | Form of snow | Snow density on slope ($g/cm^3$) | Hardness on slope ($kg/cm^3$) | Kinematic friction factor ($\mu k$) |
| --- | --- | --- | --- | --- | --- | --- |
| Example 1 | Preparative Example-1 | 50 | Powdery snow | 0.33 | 3–5 | 0.03–0.06 |
| Example 2 | Preparative Example-1 | 120 | Powdery snow on top of an ice bed | 0.33 | 3–5 | 0.02–0.04 |
| Comparative Example 1 | Comparative Preparation-1 | 50 | Powdery snow | 0.28 | 2–5 | 0.06–0.10 |
| Comparative Example 2 | Comparative Preparation-1 | 120 | Powdery snow on top of an ice bed | 0.35 | 3–4 | 0.05–0.08 |
| Comparative Example 3 | Comparative Preparation-1 | | Impossible to make snow | | | |

What is claimed is:

1. An artificial snowseed comprising granules of a super water-absorbing polymer coated with at least 0.1 w % of a fluorine-containing material, a silicone oil or mixture thereof, wherein said granules retain the original spherical form after absorption of water without sticking to each other, and wherein after absorption of water and freezing said granules have a snow structure which includes ice shells.

2. An artificial snowseed according to claim 1 wherein said fluorine-containing material is the same as the dispersant used in the manufacture of granules of said super water-absorbing polymer by a reversed-phase suspension polymerization.

3. An artificial snowseed according to claim 2 wherein said fluorine-containing material is an acrylic copolymer.

4. An artificial snowseed according to claim 3 wherein said acrylic copolymer contains 10 to 90% by weight of an acrylic or methacrylic ester moiety having three or more of fluorine atoms.

5. An artificial snowseed according to claim 1 wherein said coating is said fluorine-containing material.

6. An artificial snowseed according to claim 3 wherein said acrylic copolymer contains (meth)acrylate or (meth)acrylamide within the range of from 5 to 40% by weight.

7. An artificial snowseed according to claim 2 having a kinematic friction factor of about 0.02 to 0.05 and wherein said granules have a size of 20 to 500 μm before water absorption and 0.05 to 2 mm after water absorption and a water absorbability of about 30 to 500 times their weight.

8. An artificial snowseed according to claim 7 wherein the amount of coating is up to 10 weight percent.

9. An artificial snowseed according to claim 8 wherein the amount of said coating is 0.5 to 3 weight percent.

10. An artificial snowseed according to claim 1 having a kinematic friction factor of about 0.02 to 0.05 and wherein said granules have a size of 20 to 500 μm before water absorption and 0.05 to 2 mm after water absorption and a water absorbability of about 30 to 500 times their weight.

11. An artificial snowseed according to claim 10 wherein the amount of coating is up to 10 weight percent.

12. An artificial snowseed according to claim 11 wherein the amount of said coating is 0.5 to 3 weight percent.

13. An artificial snowseed according to claim 1 wherein said coating is said silicon oil.

14. An artificial snowseed according to claim 13 having a kinematic friction factor of about 0.02 to 0.05 and wherein said granules have a size of 20 to 500 μm before water absorption and 0.05 to 2 mm after water absorption and a water absorbability of about 30 to 500 times their weight.

15. An artificial snowseed according to claim 13 wherein the amount of coating is up to 10 weight percent.

16. An artificial snowseed according to claim 13 wherein the amount of said coating is 0.5 to 3 weight percent.

17. An artificial snowseed comprising granules of a super water-absorbing polymer coated with at least 0.1 w % of a fluorine-containing material, a silicone oil or mixture thereof, wherein said granules retain the original spherical form after absorption of water without sticking to each other, and wherein after absorption of water and freezing said granules have a kinematic friction factor of less than $0.06 \mu k$.

18. An artificial snowseed according to claim 17 having a kinematic friction factor of about 0.02 to 0.05 and wherein said granules have a size of 20 to 500 μm before water absorption and 0.05 to 2 mm after water absorption and a water absorbability of about 30 to 500 times their weight.

19. An artificial snowseed according to claim 17 wherein the amount of coating is up to 10 weight percent.

20. An artificial snowseed according to claim 17 wherein the amount of said coating is 0.5 to 3 weight percent.

21. An artificial snowseed according to claim 17 wherein said coating is said fluorine-containing material.

22. An artificial snowseed according to claim 21 having a kinematic friction factor of about 0.02 to 0.05 and wherein said granules have a size of 20 to 500 μm before water absorption and 0.05 to 2 mm after water absorption and a water absorbability of about 30 to 500 times their weight.

23. An artificial snowseed according to claim 21 wherein the amount of coating is up to 10 weight percent.

24. An artificial snowseed according to claim 21 wherein the amount of said coating is 0.5 to 3 weight percent.

25. An artificial snowseed according to claim 17 wherein said coating is said silicon oil.

26. An artificial snowseed according to claim 25 having a kinematic friction factor of about 0.02 to 0.05 and wherein said granules have a size of 20 to 500 μm before water absorption and 0.05 to 2 mm after water absorption and a water absorbability of about 30 to 500 times their weight.

27. An artificial snowseed according to claim 25 wherein the amount of coating is up to 10 weight percent.

28. An artificial snowseed according to claim 25 wherein the amount of said coating is 0.5 to 3 weight percent.

* * * * *